A. L. HEMPHILL.
CARD MAKING MACHINE.
APPLICATION FILED JAN. 25, 1907.

902,488.

Patented Oct. 27, 1908.

6 SHEETS—SHEET 1.

WITNESSES:

INVENTOR.
Alexander L. Hemphill.
BY
ATTORNEY.

A. L. HEMPHILL.
CARD MAKING MACHINE.
APPLICATION FILED JAN. 25, 1907.

902,488.

Patented Oct. 27, 1908.
6 SHEETS—SHEET 4.

WITNESSES:
N. Allemong
W. M. Gentle

INVENTOR.
Alexander L. Hemphill.
By
V. H. Lockwood
ATTORNEY.

A. L. HEMPHILL.
CARD MAKING MACHINE.
APPLICATION FILED JAN. 25, 1907.
902,488.
Patented Oct. 27, 1908.
6 SHEETS—SHEET 5.
Fig-5-
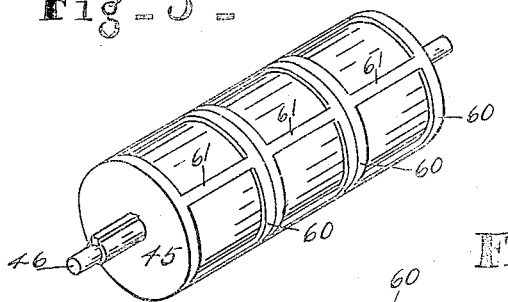
Fig-6-
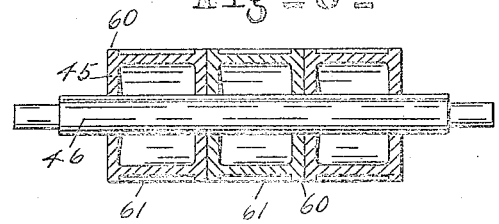
Fig-8-   Fig-7-
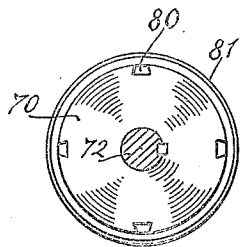 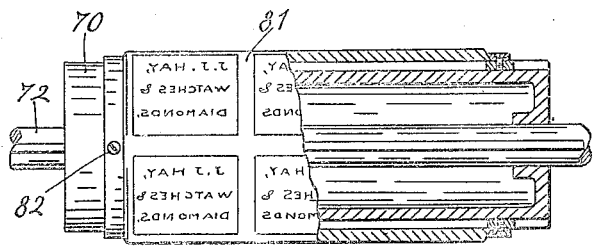
Fig-9-
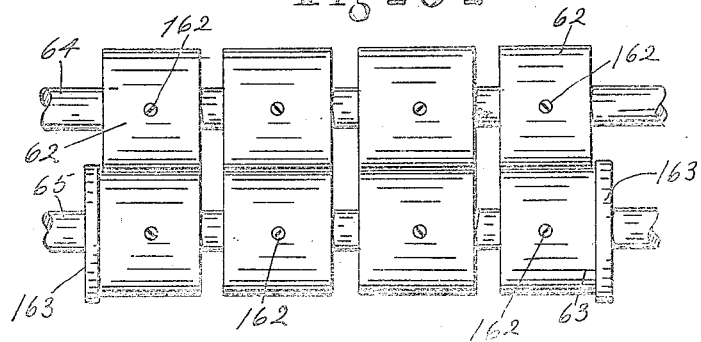
WITNESSES:
N. Allemong
W. M. Gentis
INVENTOR.
Alexander L. Hemphill.
BY
V. H. Eastwood
ATTORNEY.

A. L. HEMPHILL.
CARD MAKING MACHINE.
APPLICATION FILED JAN. 25, 1907.

902,488.

Patented Oct. 27, 1908.

6 SHEETS—SHEET 6.

WITNESSES:
N. Allemong
W. M. Gentle.

INVENTOR.
Alexander L. Hemphill
BY V. H. Lockwood
ATTORNEY.

UNITED STATES PATENT OFFICE.

ALEXANDER L. HEMPHILL, OF INDIANAPOLIS, INDIANA, ASSIGNOR OF ONE-HALF TO ANTHONY HARMON, OF INDIANAPOLIS, INDIANA.

CARD-MAKING MACHINE.

No. 902,488.　　　　　Specification of Letters Patent.　　　　　Patented Oct. 27, 1908.

Application filed January 25, 1907. Serial No. 354,144.

*To all whom it may concern:*

Be it known that I, ALEXANDER L. HEMPHILL, of Indianapolis, county of Marion, and State of Indiana, have invented a certain new and useful Card-Making Machine; and I do hereby declare that the following is a full, clear, and exact description thereof, reference being had to the accompanying drawings, in which like letters refer to like parts.

One feature of the invention consists in making coin-mailing cards by bringing together two strips of paper and applying adhesive material to them in rectangular or other similar form so as to leave compartments between the cards, and in cutting coin slots in one of said strips prior to the union of the strips that register with said compartments, so that coin may be inserted therein, and afterwards printing and cutting the strips into cards suitable for mailing coin. This and the other features of the invention will be understood from the accompanying drawings and the following description and claims.

Figure 1:
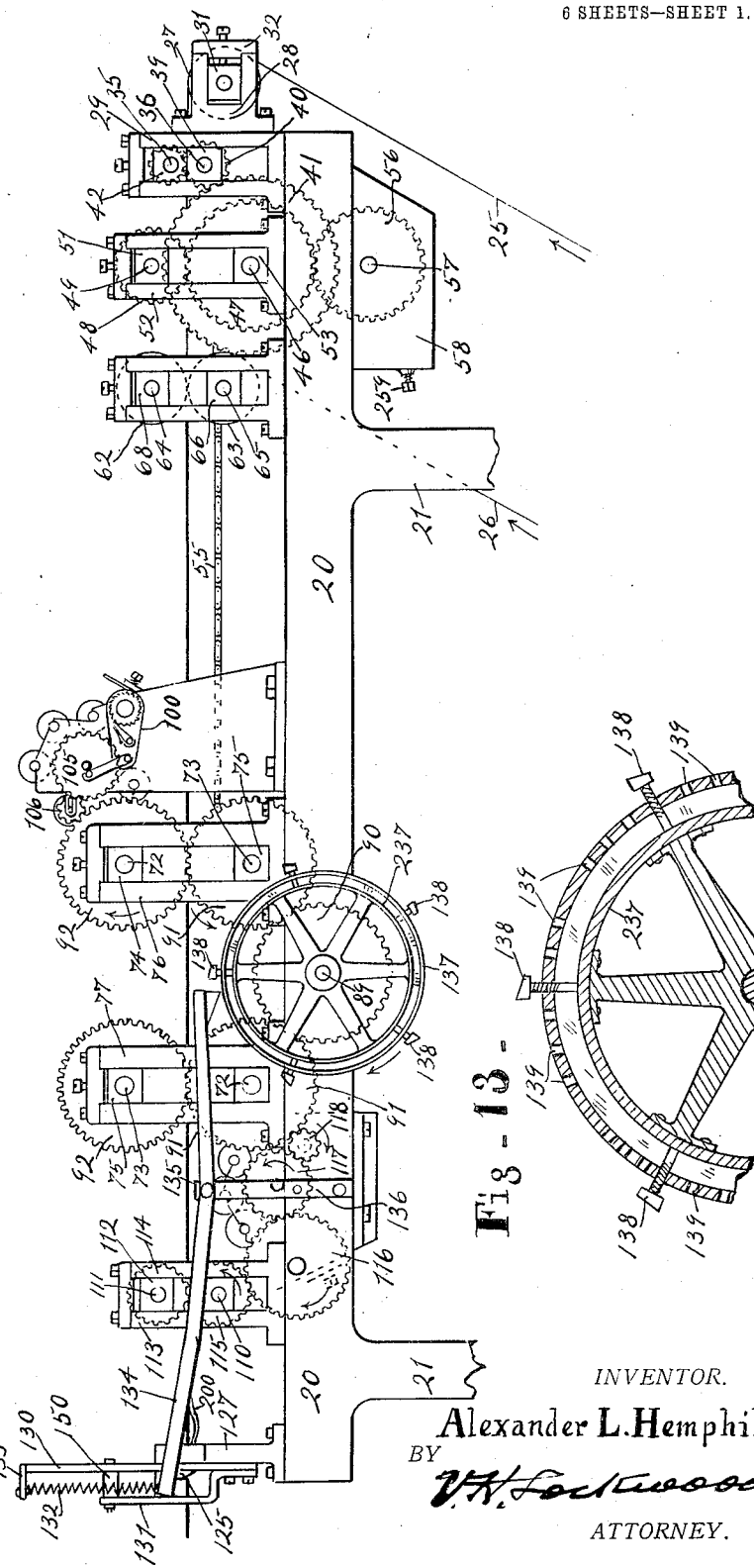
Figure 2:
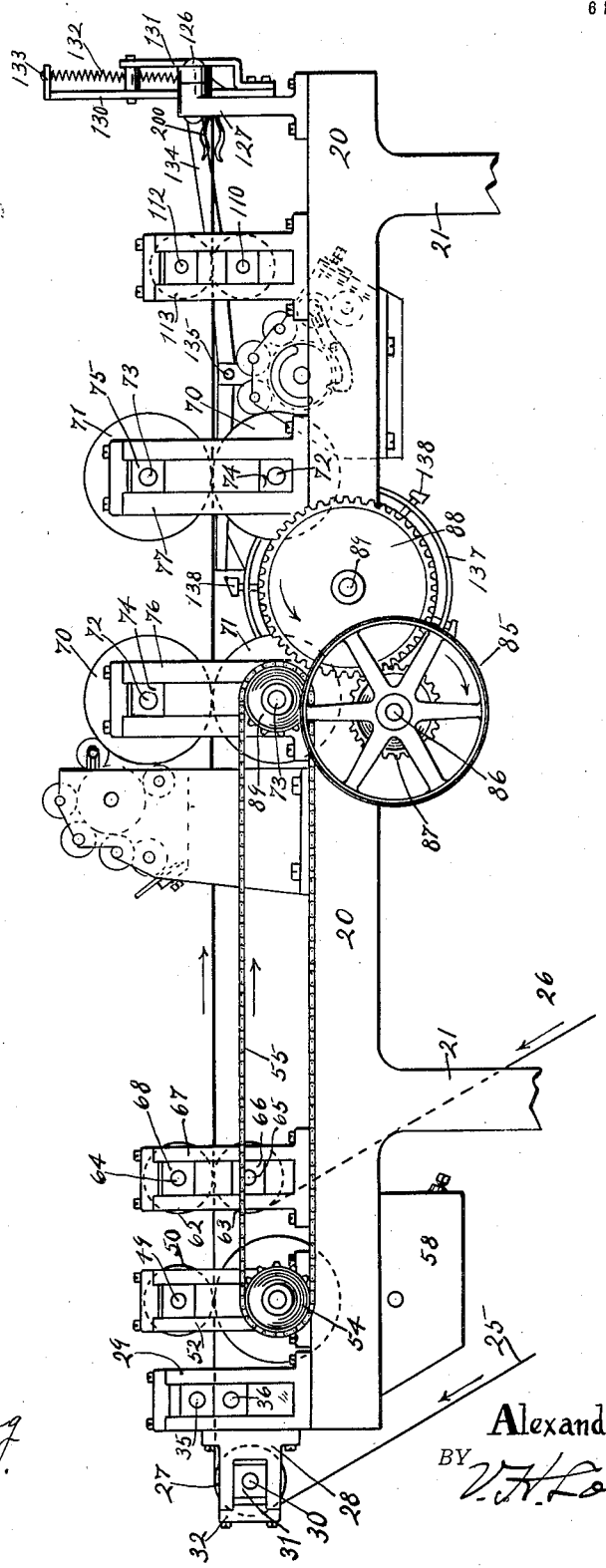
Figure 3:
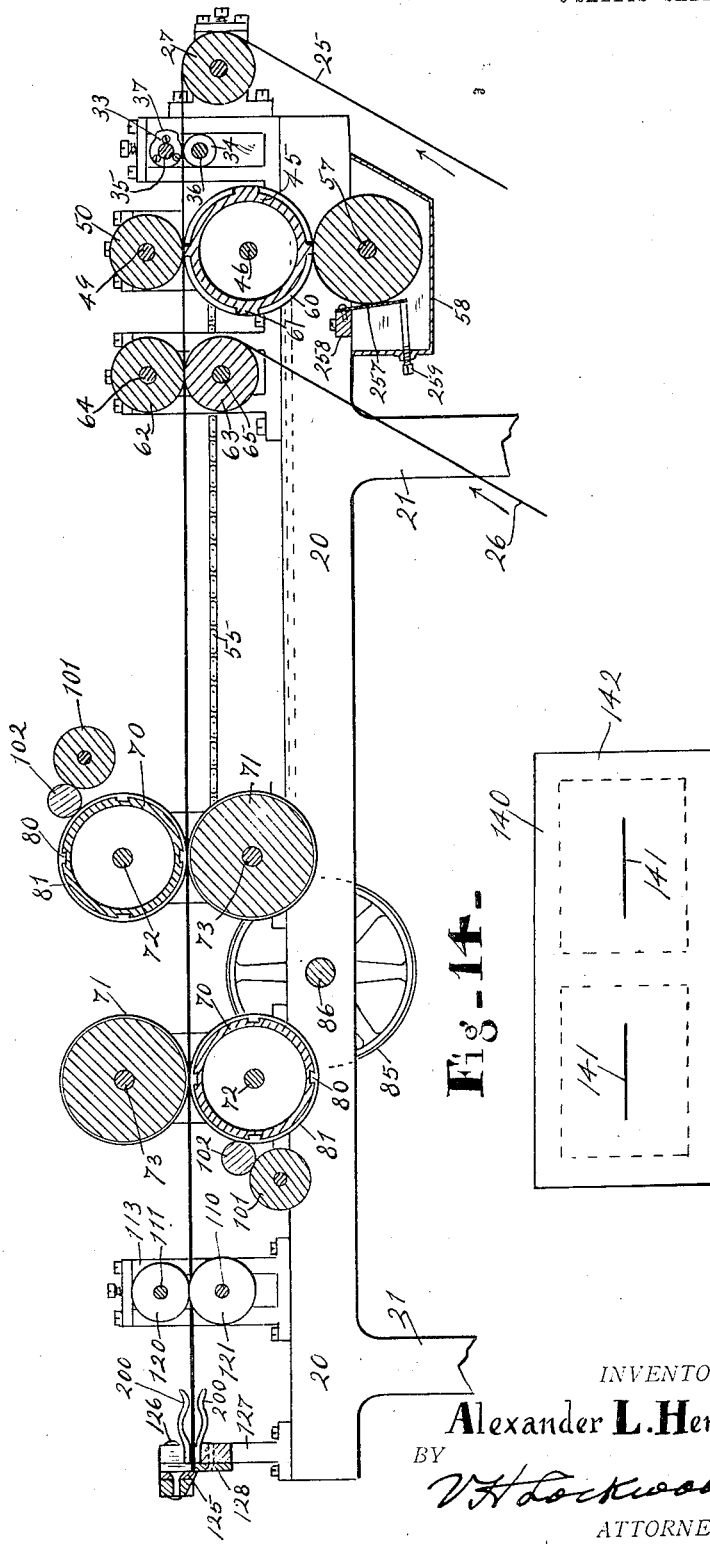
Figure 4:
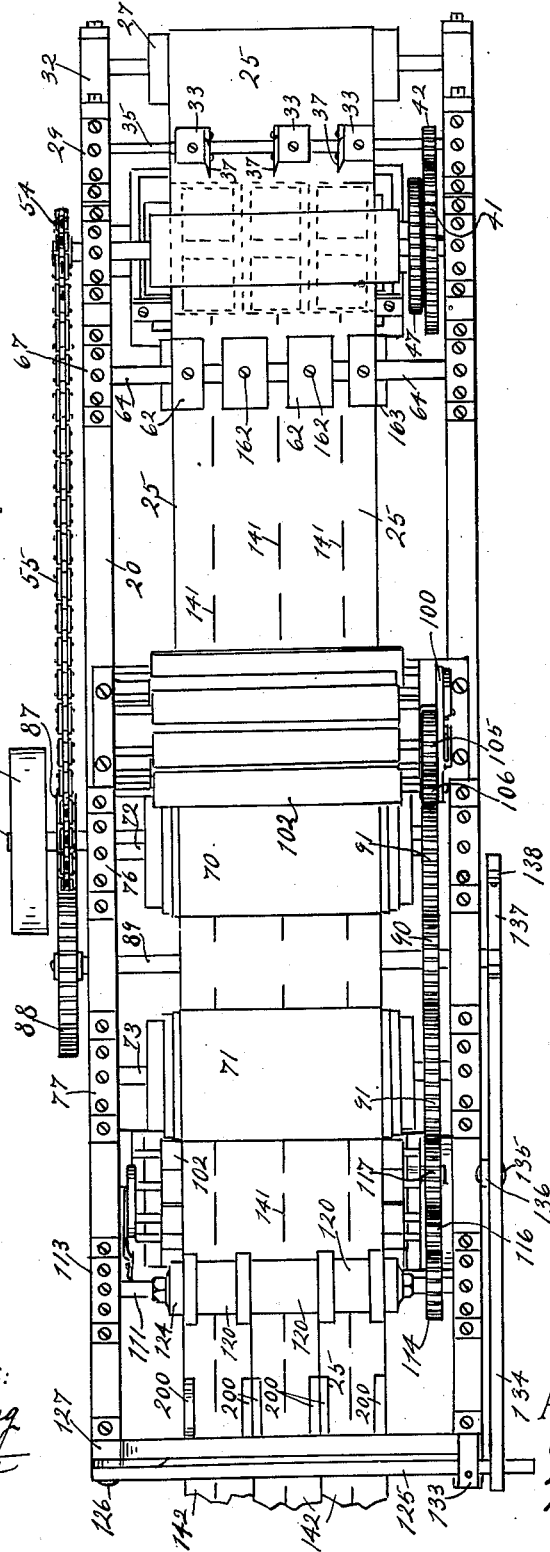
Figure 10:
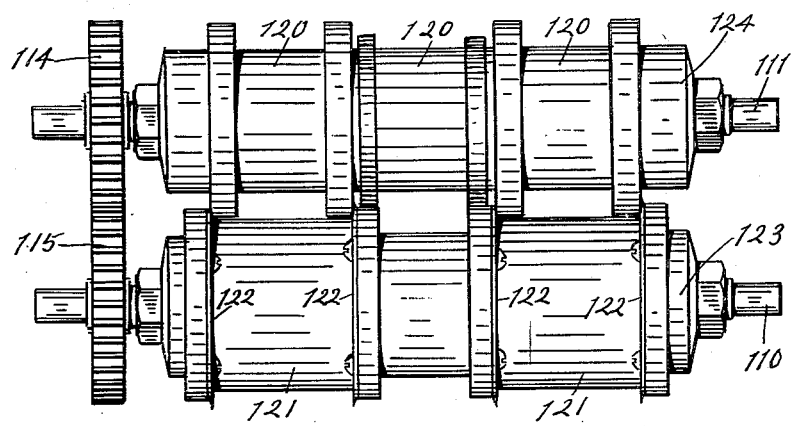
Figure 11:
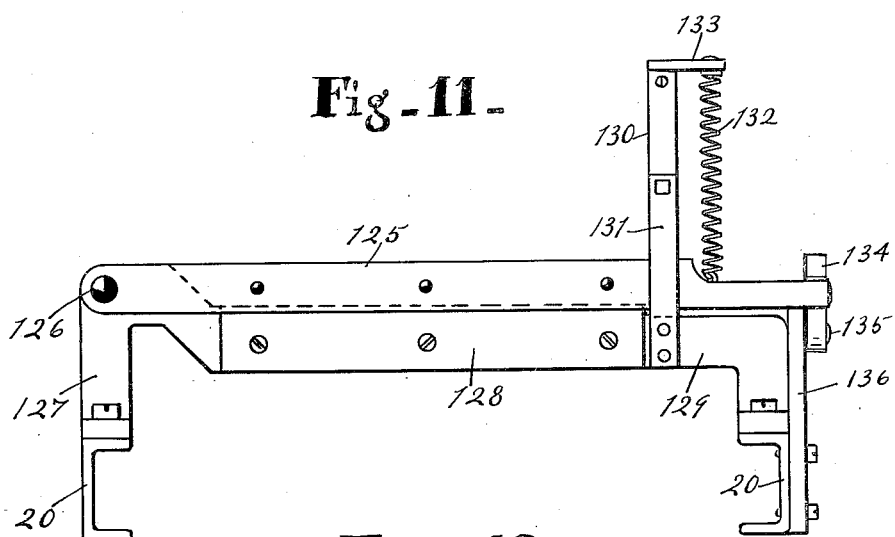
Figure 12:
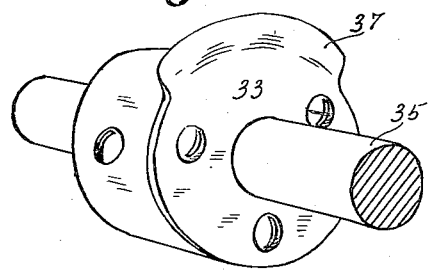

In the drawings, Figure 1 is an elevation of the upper part of the right-hand side of the machine, the lower part thereof being broken away. Fig. 2 is an elevation of the upper part of the left-hand side of the machine, the lower part being broken away. Fig. 3 is a central vertical section through the upper part of the machine view from the same side as in Fig. 1 and omitting parts of the ink fountains. Fig. 4 is a plan view of the machine. Fig. 5 is a perspective view of the paste-applying roll. Fig. 6 is a longitudinal central section thereof. Fig. 7 is a half plan and half central longitudinal section of the printing cylinder, parts being broken away. Fig. 8 is a central transverse section of the printing cylinder. Fig. 9 is an elevation of the pressing or pasting rolls, the shafts being broken away at the ends. Fig. 10 is an elevation of the rotary cutters for longitudinally cutting or slitting the card strip. Fig. 11 is a front elevation of the knife mechanism for cutting the strips into cards. Fig. 12 is a perspective view of the slotting knife. Fig. 13 is a central sectional view of the upper part of the wheel for actuating the knife lever, parts being in section. Fig. 14 is a plan view of a coin mailing card made by this machine, the pasted portion being shown by dotted lines.

The machine is provided in the first place with a main frame with upper longitudinal side bars 20 supported by legs or posts 21. These two side bars 20 are held in place by suitable cross-bars on the lower part of the frame, which do not appear since the lower part of the frame is not herein shown, as it constitutes no part of the invention. But the frame is constructed so that the top thereof will be about three feet high, or high enough for convenient operation.

Two strips or continuous sheets of paper 25 and 26 are used in forming cards by this machine. They come from independent rolls mounted on the lower part of the machine, not here shown. What may be called the upper strip 25 passes over a roll 27 mounted at the rear end of the machine in brackets 28 secured to the rear surfaces of the vertical stands 29 that are mounted upon the side bars 20 of the frame. The roll 27 has spindles 30 at the ends operating in boxes 31 that are held in two rearwardly extending arms of the bracket 28 by a vertical plate 32. From said roll the strip 25 is drawn horizontally through the machine, first passing between the slotting dies 33 and roll 34 the die 33 being on the shaft 35. The dies 33 consist of a disk with a cutting projection extending radially therefrom, which cuts through the strip of paper. The slots thus punched in the strip of paper 25 are made large enough to insert a coin. The shaft 36 carrying roll 34 is mounted in boxes 39 in the bracket 29, and has on its right-hand end a gear 40 that meshes with and is driven by a gear 41. The gear 40 drives a gear 42 on the shaft 35, and in this manner the roll 34 and cutters 33 are actuated positively. The strip of paper 25 next passes to the paste applying apparatus, which consitsts of the paste-applying rolls 45 mounted on a shaft 46 which carries the gear 41 above referred to, and also a somewhat similar gear 47 that engages a gear 48 on shaft 49 connected with the upper roll 50. The shaft 49 is mounted in a box 51 that is slidable in a stand 52, so that the roll 50 will rest by gravity upon the paste roll 45. The shaft 46 of the paste roll is mounted in boxings 53 in the lower part of the stand 52. This shaft 46 is driven by a sprocket wheel 54 and a chain 55. The gear wheel 47 meshes with the gear 56 at the end of the paste roll 57, the spindles of which are mounted in the ends of the paste box or receptacle 58 that is secured to the lower under side of the bars 20 of the frame, the arrangement being such that the lower part of the paste roll 57 operates in said paste receptacle, whereby its periphery will carry paste and bring the same into contact with the pasting surfaces of the paste roll 45. The pasting surfaces of this roll are shown in Figs. 5 and 6. In fact, there is there shown three rolls for pasting simultaneously the strip of paper for coin cards in triplicate. However, one or two of these, or any number of them may be used as desired. Each of these rolls 45 has an annular paste-applying surface 60 around the periphery thereof at each end, and transversely extending paste-applying surfaces 61 extending between the paste-applying surfaces 60 at intervals, there being four shown in the drawings, so that for each revolution of a roll 45, it will apply paste to the paper strip for making coin cards with four compartments, and all three of the rolls will make twelve compartments. It is observed that the surface of said paste rolls within the paste-applying surfaces is depressed.

The strip 25 passes from the paste-applying means between the presser rolls 62 and 63 mounted on shafts 64 and 65, and as said strap passes between said rolls with paste applied to its under surface, the other paper strip 26 is carried between said rolls under the paper strip 25, whereby said rolls press and paste the two strips together. Inasmuch as slight pressure only is needed between these two rolls, neither is positively driven, but the shaft 65 of the lower roll is mounted in boxes 66 in the lower part of the stand 67, while the shaft 64 of the upper roll is mounted in boxes 68 slidable in said bracket so that the upper roll 62 rests by gravity on the lower rolls 63. On each shaft there is a plurality of pressing rolls fastened in place adjustably by set screws 162, so that the number of said rolls on each shaft may be modified to suit the width of the paper strips. The end rolls 63, as shown in Fig. 9, have flanges 163 at their outer ends to guide the paper strips. The paper strips, now being pasted together, pass on through the machine, first through means for printing the upper surface of the combined strip and then through means for printing the lower surface of the combined strip. Each printing apparatus is substantially the same excepting the position of the parts is reversed. In one the type cylinder is located above, and in the other, below the card strip, and opposite each printing cylinder there is a roll 71. The spindles 72 of the printing cylinders, and 73 of the rolls are mounted in boxes 74 and 75 in the stands 76 and 77. The type cylinders are provided, as shown in Figs. 7 and 8, with longitudinal dovetailed grooves containing blocks or bars 80 dovetailed in cross-section that are slidable in said grooves, and the type plate 81 is secured on the cylinder by screws 82 that screw into said blocks 80. While the screws are somewhat loose, the type plate can be adjusted longitudinally with the cylinder, and then when the screws are tightened, it will be held securely in place. This is to enable the type plate to be adjusted properly with relation to the card strip.

The machine is driven from some suitable source of power applied to the driving pulley 85 on the shaft 86 mounted in bearings, not shown, secured to the underside of the frame bars 20, and carrying a pinion 87 that meshes with a gear 88 on a shaft 89 extending through the machine and mounted in the bars 20. On the shaft 89 near the right-hand side of the machine, there is a pinion 90 that meshes with and drives a gear 91 on the shaft 73 of the roll 71, which in turn meshes with a gear 92 that drives the printing cylinder 70 above it. The gear 90 also drives the corresponding gears 91 and 92 on the other pair of the printing rolls. The shaft 73 of the roll 71 has a sprocket wheel 93 for driving the sprocket chain 55.

The construction of the rotary cutters appears in Fig. 10. There is a lower shaft 110 and an upper shaft 111 mounted in boxings 112 in the stand 113. The shaft 111 has on it a gear 114 that meshes with a gear 115 on the lower shaft 110, and that is driven by a gear 116, and that in turn is driven by a gear 117, which is driven by a pinion 118, and it is driven by the gear 91. The cutters consist of coöperating flanged cylinders mounted on said shafts. There are three of the smaller cylinders 120 on the upper shaft and a central one on the lower shaft, and there are two of the larger cylinders 121 on the lower shaft. These have overlapping flanges or rolling cutters 122 that cut the paper as it passes between the rolling cutters. Each group of rolling cutters and cylinders is held on its shaft by combined collars and nuts 123 and 124. This construction enables the cutters to be adjusted to cut the strip longitudinally into any number of narrower strips. The device shown in the drawings cuts three strips the width of a coin card.

From the rolling cutters the strips pass between guiding or holding fingers 200 under a knife 125, which appears in Fig. 11. This knife extends horizontally across the machine, being pivoted by a pin 126 to the top of a stand 127 which is mounted on a frame bar 20. The movable knife coöperates with a stationary knife 128, which is secured to a bar 129 extending from the stand 127 on one side to the other side of the machine. The knife 125 is guided in its vertical movement between two plates 130 and 131, and stopped in its upward movement by a pin 150. A spring 132 is connected at its lower end with the knife and at its upper end to the bar 133 on the top of the guide bar 130. The function of this spring is to raise the knife when not forced down or actuated by a lever 134, which is fulcrumed at 135 to the bar 136 secured to the right-hand side of the frame bar 20. The rear end of this bar extends near the periphery of the wheel 137 which is mounted on the shaft 89, and a V-shaped lug on said lever is actuated by bevel headed screws 138 inserted in the periphery of said wheel. By increasing or diminishing the number of said screws 138, the rapidity of operation of the knife may be increased or diminished. Consequently a number of screw holes 139 are placed in the outer rim of said wheel and an inner annular plate 237 serves as a stop to determine the limit of the screws 138 and make their heads all extend a uniform distance from the outer rim.

From the foregoing description it is seen that this machine will bring together and paste together two continuous strips of paper or card-board one of which is previously cut with coin slots, and the paste will be applied in rectangles so as to leave coin receptacles between said sheets of paper, as appears in Fig. 14, wherein there is shown a coin-mailing card 140 with two coin slots 141, and the pasted parts 142 being shown by dotted lines. And said compound strip passes between two sets of printing apparatus, whereby both the top and bottom sides are printed, and between cutting rolls which longitudinally slit the card strip into three narrow strips, each the width of a coin-mailing card, and the knife 125 at each stroke cuts off one card from each strip, or three cards at a time in the machine as herein shown. If it be desired to double the length of the cards, every alternate knife-actuating screw 138 is removed.

To regulate and limit the quantity of paste carried up to the paste box 58 by the roller 57 a vertical plate 257 is mounted in the paste-box beside the roll 57, being supported by a cross-bar 258 on the paste-box near said roll 57 so that said plate 257 which is made of spring brass can be forced towards and in rather close engagement with the roll 57 by set-screws 259 mounted in the box 58 to diminish the quantity of paste left on the roll 57 to be conveyed to the paste applying roll above.

The word "paper" used herein includes cardboard and the like as well as paper other than cardboard. The machine herein described operates upon what is techincally known as "cardboard."

What I claim as my invention and desire to secure by Letters Patent is:

1. A card-making machine including means through which a sheet of paper is continuously passed for cutting slots therein, paste-applying rolls through which said strip subsequently passes and which are adapted to apply paste to one side thereof at points surrounding said slots, presser rolls through which said strip passes and also another strip of paper on the paste side of said first mentioned strip, whereby the two strips are formed into a combined strip, and means for subsequently cutting said strip into cards including one or more slotted compartments.

2. A card-making machine including means through which a sheet of paper is continuously passed for cutting slots therein, paste-applying rolls through which said strip subsequently passes and which are adapted to apply paste to one side thereof at points surrounding said slots, presser rolls through which said strip passes, and also another strip of paper on the paste side of said first mentioned strip, whereby the two strips are formed into a combined strip, means for longitudinally slitting said combined strip between the slotted compartments, and means for afterwards cutting said strips transversely between the slotted compartments to form coin-mailing cards.

3. A card-making machine including means for conveying a continuous strip of paper through the machine, means for slitting said strip, a roll for applying paste to one side of said strip, said roll having depressions in its surface so that no paste will be applied to portions of said strip, rolls through which said pasted strip and another strip of paper passes for pasting the two together, and means for subsequently cutting the combined strip into cards.

In witness whereof, I have hereunto affixed my signature in the presence of the witnesses herein named.

ALEXANDER L. HEMPHILL.

Witnesses:
H. B. McCord,
N. Allemong.